May 31, 1932. W. RIEHM 1,861,362
INJECTION COMBUSTION ENGINE HAVING AN AIR GRANARY
Filed Nov. 16, 1931
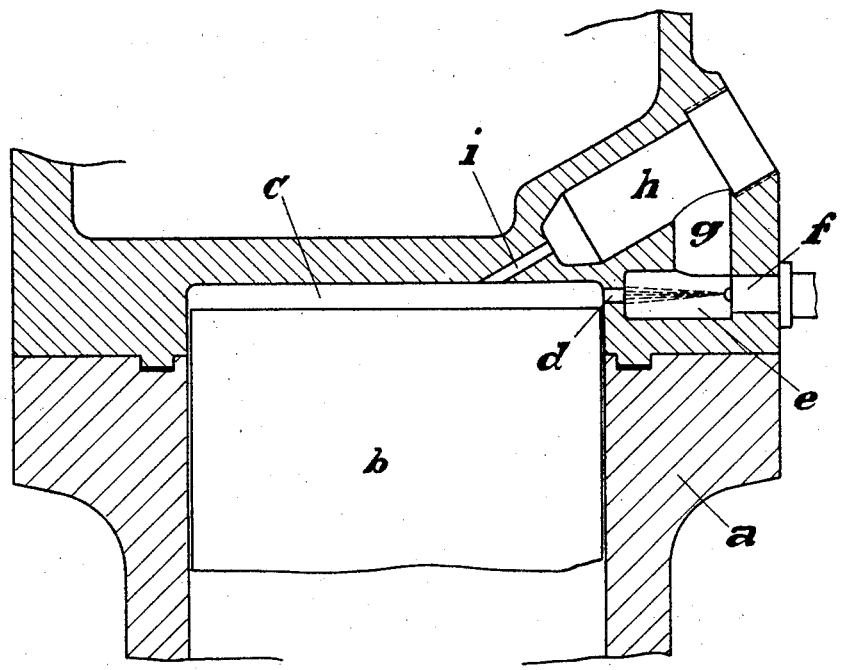

Patented May 31, 1932

1,861,362

UNITED STATES PATENT OFFICE

WILHELM RIEHM, OF AUGSBURG, GERMANY, ASSIGNOR TO MASCHINENFABRIK AUGSBURG-NURNBERG A. G., OF AUGSBURG, GERMANY, A CORPORATION OF GERMANY

INJECTION COMBUSTION ENGINE HAVING AN AIR GRANARY

Application filed November 16, 1931, Serial No. 575,386, and in Germany November 13, 1930.

This invention relates to internal combustion engines and more particularly to engines operating on the fuel injection principle.

One of the principal objects of the invention is the provision of an internal combustion engine of high operating efficiency incorporating simple and effective means for securing complete combustion and mixing of the fuel charge.

Another object of the invention is the provision of an internal combustion engine and its method of operation, in which an air storage compartment communicates with a preliminary combustion chamber so as to force air into the engine combustion chamber while combustion of fuel in the preliminary combustion chamber is taking place.

Other objects and advantages of the invention will be apparent from the following description, the accompanying drawing and the appended claims.

The single figure of the drawing is a fragmentary sectional view of an engine constructed in accordance with the present invention; the section being taken in the direction of the engine cylinder axis.

Referring more particularly to the drawing, $a$ designates the cylinder of an internal combustion engine having a piston $b$, the piston and the cylinder together defining a combustion chamber $c$. An air storage compartment $h$ is provided having continuous communication with the combustion chamber $c$ by means of a passage $i$, which is of limited size, and which preferably is inclined toward a central part of the combustion chamber $c$. A second compartment $e$ has continuous communication with the combustion chamber through a passage $d$ of limited size. The fuel injection nozzle $f$ is positioned in the compartment $e$ and, as shown, is so located that the fuel injection is directed toward the passage $d$. A passage $g$ provides communication between the compartments $e$ and $h$ independently of chamber $c$.

During the compression stroke of the piston $b$ air is compressed by the piston in the chamber $c$ and flows into and is stored in the various passages and compartments. As is typical in engines of the Diesel type, fuel is injected at the nozzle $f$ at a proper time in the operating cycle of the piston; the fuel being ignited by the heat of compression. By discharging the fuel into the compartment $e$ rather than the combustion chamber $c$, partial ignition of the fuel occurs in this compartment $e$ which is in effect a preliminary combustion chamber. The combustion of fuel in the chamber $e$ results in an increase of pressure within this compartment so that there is a pronounced excess of pressure above that of the combustion chamber $c$. This excess of pressure acts through the passage $g$ on the air stored in the compartment $h$ to force that air into the engine combustion chamber $c$, and also serves to accelerate the entrance of the remaining unburned fuel through the passage $d$ into the combustion chamber $c$. As the passage $d$ is in continuous communication with the working cylinder and never closed by the piston $b$, and as the passage $g$ extends transversely from the compartment $e$, and also since the relative proportions of passages $d$, $g$ and $i$ are such that at the time of fuel injection substantially no air current is flowing from chamber $e$ to chamber $h$, there will be no great flow of fuel into the air storage chamber $h$ where it might burn and so exhaust the air supply in the air storage chamber.

Without the communicating passage $g$ from the preliminary combustion chamber $e$ to the air storage compartment $h$ the air stored in the compartment $h$ would not be released into the combustion chamber until such time in the expansion stroke of the piston that the pressure in $h$ exceeded the pressure in $c$, as this could only occur as the result of a pressure differential between the compartment $h$ and the chamber $c$. The provision of the passage $g$ causes a pressure rise in the compartment $h$ starting at the same time or immediately after the time combustion starts in compartment $c$. There is therefore a blast of air through passage $i$ throughout substantially the entire time of combustion and beginning prior to the start of the expansion stroke of the piston. The flow of air through the passage $i$ and its entrance within the combustion chamber $c$ as a jet acting under the force of pressure within the compartments serves to set up a violent turbulence within the combustion chamber which results in complete intermingling of the fuel and air for effective combustion. Further, the capacity of the compartment $h$ is such that air flow through the passage $i$ continues after combustion starts within the chamber $c$, so that the combustion period is extended by supplying additional combustion air, to provide a desired slow burning of the fuel.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What I claim is:

1. In an internal combustion engine of the character described, a cylinder, a piston movable in the cylinder and forming therewith an engine combustion chamber, an air storage compartment, a restricted passage providing continuous communication between the air storage compartment and the combustion chamber, a second compartment constituting a preliminary combustion chamber, a second restricted passage, said second compartment being in continuous communication with said engine combustion chamber through said second restricted passage, a fuel nozzle opening into said second compartment, and a passage independent of the combustion chamber and interconnecting said compartments, whereby the increase in pressure due to preliminary combustion of fuel in said second compartment will act through said passage interconnecting said compartments to force air from said air storage compartment through said first restricted passage into the said engine combustion chamber, independently of any drop in pressure in said engine combustion chamber due to the downward movement of said piston.

2. In an internal combustion engine of the character described, a cylinder, a piston movable in the cylinder and forming therewith an engine combustion chamber, an air storage compartment, a restricted passage providing continuous communication between the air storage compartment and the combustion chamber, a second compartment constituting a preliminary combustion chamber, a second restricted passage, said second compartment being in continuous communication with said engine combustion chamber through said second restricted passage, a fuel nozzle opening into said second compartment, and a passage independent of the combustion chamber and interconnecting said compartments, said last named passage being relatively larger than the restricted passages whereby the increase in pressure due to preliminary combustion of fuel in said second compartment will act through said passage interconnecting said compartments to force air from said air storage compartment through said first restricted passage into the said engine combustion chamber, independently of any drop in pressure in said engine combustion chamber due to the downward movement of said piston.

In testimony whereof I affix my signature.

WILHELM RIEHM.